(12) United States Patent
Bacallao (10) Patent No.: US 10,106,327 B2
(45) Date of Patent: Oct. 23, 2018

(54) CHECKOUT STATION BUMPER

(71) Applicant: Wal-Mart Stores, Inc., Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/860,984

(22) Filed: Jan. 3, 2018

(65) Prior Publication Data

US 2018/0208399 A1 Jul. 26, 2018

Related U.S. Application Data

(60) Provisional application No. 62/448,484, filed on Feb. 20, 2017.

(51) Int. Cl.
*A47F 9/04* (2006.01)
*B65G 23/14* (2006.01)
(Continued)

(52) U.S. Cl.
CPC ............ *B65G 23/14* (2013.01); *B65B 35/243* (2013.01); *B65G 43/02* (2013.01); *G06F 3/0317* (2013.01)

(58) Field of Classification Search
CPC ........ A47F 9/00; A47F 9/04; A47F 2009/041; A47B 96/061; A47B 96/1441; A47B 97/00; B65G 21/20
See application file for complete search history.

(56) References Cited

U.S. PATENT DOCUMENTS 3,614,853 A 10/1971 Seragnoli
4,128,177 A 12/1978 Bustos
(Continued)

FOREIGN PATENT DOCUMENTS

DE 202016102341 U1 5/2016
EP 3087877 A1 11/2016
(Continued)

OTHER PUBLICATIONS

"4pcs 6/8/10/12mm Acrylic Fish Tank Glass Clip Aquarium Shelf Lamp Bracket Rack Support Holder Fixed Cover Filter Barrel," AliExpress.com, accessed Nov. 30, 2016, (3 pages).
(Continued)

*Primary Examiner* — Mark J Beauchaine
(74) *Attorney, Agent, or Firm* — Schmeiser, Olsen & Watts LLP (57) ABSTRACT

Described is a checkout station in a retail store that includes a bumper for preventing dividers from covering a belt end sensor. The belt end sensor senses when items on a checkout station conveyor belt have reached the end of the conveyor belt. If a divider stored on an edge wall alongside the conveyor belt covers the belt end sensor, the conveyor belt stops motion when it should keep moving. The checkout station includes a bumper that couples to the edge wall. The bumper prevents the dividers from covering the belt end sensor and interfering with the operation of the belt end sensor and the conveyor belt. The bumper includes a backbone and a hook coupled to the backbone. The hook couples the bumper to the edge wall. When the bumper is coupled to the edge wall, the bumper blocks dividers from covering the belt end sensor.

18 Claims, 7 Drawing Sheets

(51) Int. Cl.
*G06F 3/03* (2006.01)
*B65B 35/24* (2006.01)
*B65G 43/02* (2006.01)

(56) References Cited

U.S. PATENT DOCUMENTS

| | | | |
|---|---|---|---|
| 5,376,923 A | | 12/1994 | Kindschy |
| RE35,455 E | * | 2/1997 | Sakurai ............... A47F 9/04 |
| | | | 186/61 |
| 6,148,960 A | * | 11/2000 | Fraser ............... A47F 9/04 |
| | | | 186/68 |
| 2016/0152416 A1 | | 6/2016 | Staab et al. |

FOREIGN PATENT DOCUMENTS

| | | |
|---|---|---|
| EP | 3281565 A1 | 2/2018 |
| JP | 3785123 B2 | 6/2006 |
| WO | 2014068446 A1 | 5/2014 |

OTHER PUBLICATIONS

"2X Solo Glide Curtain Track Rail Brackets Swish Sologlyde Bracket Sologlide," EBay.com, accessed Nov. 30, 2016, (3 pages).
"Shelf Management System Divider Stopper Right," HBDisplays.com, accessed Nov. 20, 2016, (2 pages).
"Products: Conveyers—Accessories," RCO.ind.br, accessed Nov. 30, 2016, (3 pages).
Search Report in counterpart UK Patent Application No. GB1800091.9, dated Jun. 15, 2018; 3 pages.

* cited by examiner

CHECKOUT STATION BUMPER

CROSS REFERENCE TO RELATED APPLICATIONS

This invention claims priority to U.S. provisional patent application Ser. No. 62/448,484, filed Jan. 20, 2017 to Applicant Wal-Mart Stores Inc., and entitled "Checkout Station Bumper", the contents of which are included entirely herein by reference.

BACKGROUND OF THE INVENTION

Technical Field

This invention relates to fixtures in a retail store, and specifically to a bumper that mounts alongside a checkout station conveyor belt and prevents checkout station dividers from interfering with the operation of a belt end sensor of the checkout station.

State of the Art

A checkout station is a location in a retail store where customers pay for and bag the items they are purchasing. A checkout station, also known as a point-of-sale station, often includes a checkout register and a scanner to capture information from items being purchased. Checkout stations often include conveyor belts that carry products to the scanner, and dividers used by customers to divide one customer's items from the next customer's items on the conveyor belt. Dividers are often hung on an edge wall adjacent the conveyor belt. The dividers can cause problems when they cover the belt end sensor that controls the automated movement of the conveyor belt. What is needed is a means to prevent dividers from interfering with the operation of the belt end sensor and the automated movement of the conveyor belt.

Accordingly, what is needed is a bumper that couples to the checkout station that keeps dividers from covering the belt end sensor.

DETAILED DESCRIPTION OF EMBODIMENTS OF THE INVENTION

As discussed above, embodiments of the present invention relate to fixtures in a retail store, and specifically to a bumper that mounts alongside a checkout station conveyor belt and prevents the checkout station dividers from interfering with the operation of a belt end sensor of the checkout station.

Disclosed is a checkout station in a retail store that includes a checkout register, a conveyor belt for moving items and a scan area for scanning product bar codes. The conveyor belt moves items to be purchased towards the scan area. Once an item reaches the scan area, its bar code is scanned to enter the item and its price into the checkout register. The checkout station also includes a belt end sensor that senses when items on the conveyor belt have reached the end of the conveyor belt. The checkout station also includes a bumper that couples to an edge wall adjacent the conveyor belt. The bumper prevents dividers that are stored on the edge wall from covering the belt end sensor and interfering with the operation of the belt end sensor and the conveyor belt. When the belt end sensor is covered by the divider, the belt end sensor is activated, and stops the conveyor belt. The bumper includes a backbone and a hook. The hook is coupled to the backbone. The hook couples the bumper to the edge wall. When the bumper is coupled to the edge wall, the bumper blocks dividers from covering and activating the belt end sensor.

A checkout station—also known as a point-of-sale station—is a location in a retail store where customers pay for and bag the items they wish to purchase. Checkout stations often include a checkout register to ring up purchased items, and a scanner to capture information from the items being purchased. Checkout stations can be self-checkout stations where the customer scans and pays for the items themselves, or the checkout station can be manned with a retail store employee that performs some or all of the checkout station tasks. Checkout stations often include conveyor belts that carry products to a scanning area. The conveyor belt can include a belt end sensor positioned near the end of the conveyor belt. The belt end sensor automatically turns the conveyor belt on and off depending on whether the belt end sensor senses that items have reached the end of the conveyor belt. The belt end sensor can be an optical sensor, or other type of sensor or means for determining when items have reached the end of the conveyor belt. If the belt end sensor does not sense any items at the conveyor belt end of the conveyor belt, the conveyor belt will move to carry items towards the scan area, until the belt end sensor senses items at the conveyor belt end. Once the belt end sensor senses that an item has reached the conveyor belt end, the belt end sensor is activated, and stops the movement of the conveyor belt.

Checkout stations also usually include dividers used by customers to divide one customer's items from the next customer's items on the conveyor belt. Dividers are often stored on an edge wall adjacent the conveyor belt so that they are convenient for customers to grab and place before or after their group of items on the conveyor belt. The dividers setting on the edge wall can cause problems when they cover the belt end sensor that controls the automated movement of the conveyor belt. Described herein is a means to keep dividers from interfering with the operation of the belt end sensor and the automated movement of the conveyor belt. Described is a means to prevent a divider from covering and activating a belt end sensor at a checkout station, and a means to couple the means to prevent the divider from covering the belt end sensor to an edge wall.

Figure 1:
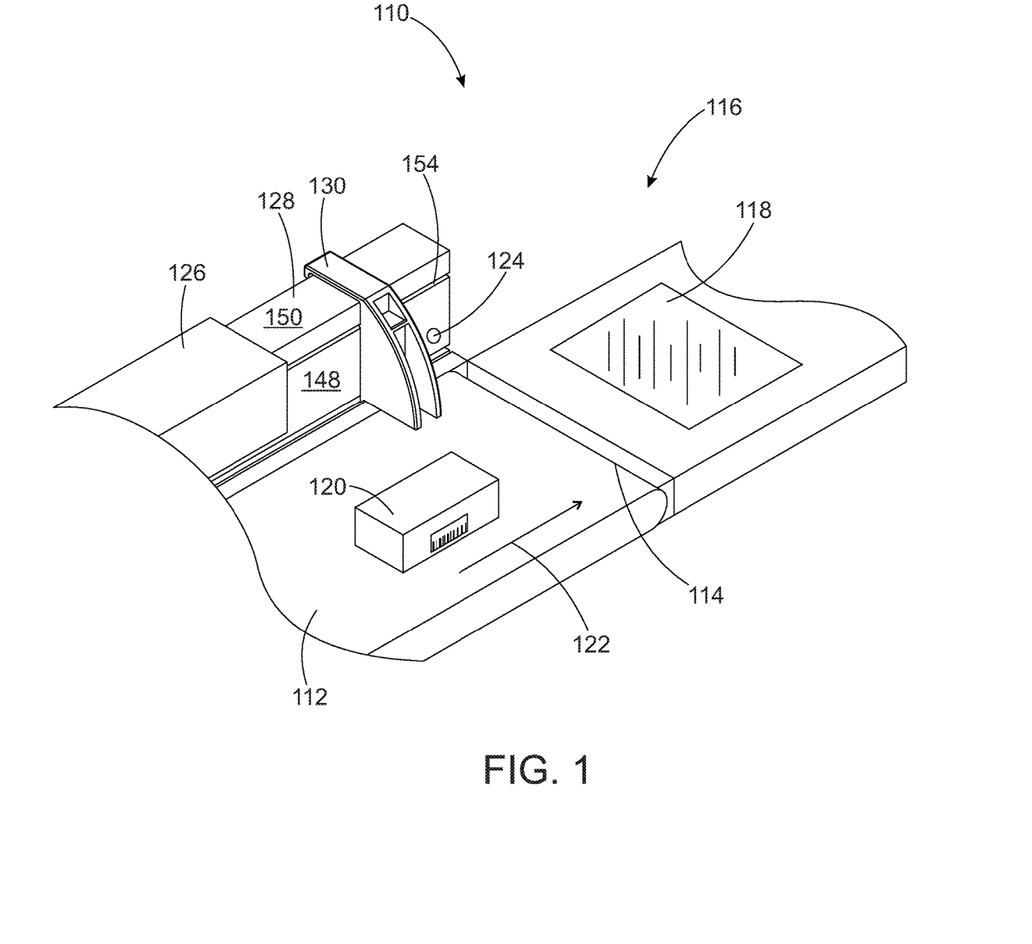
FIG. 1 shows a portion of a checkout station in a retail store using a bumper for preventing a divider from covering a belt end sensor.
Figure 2:
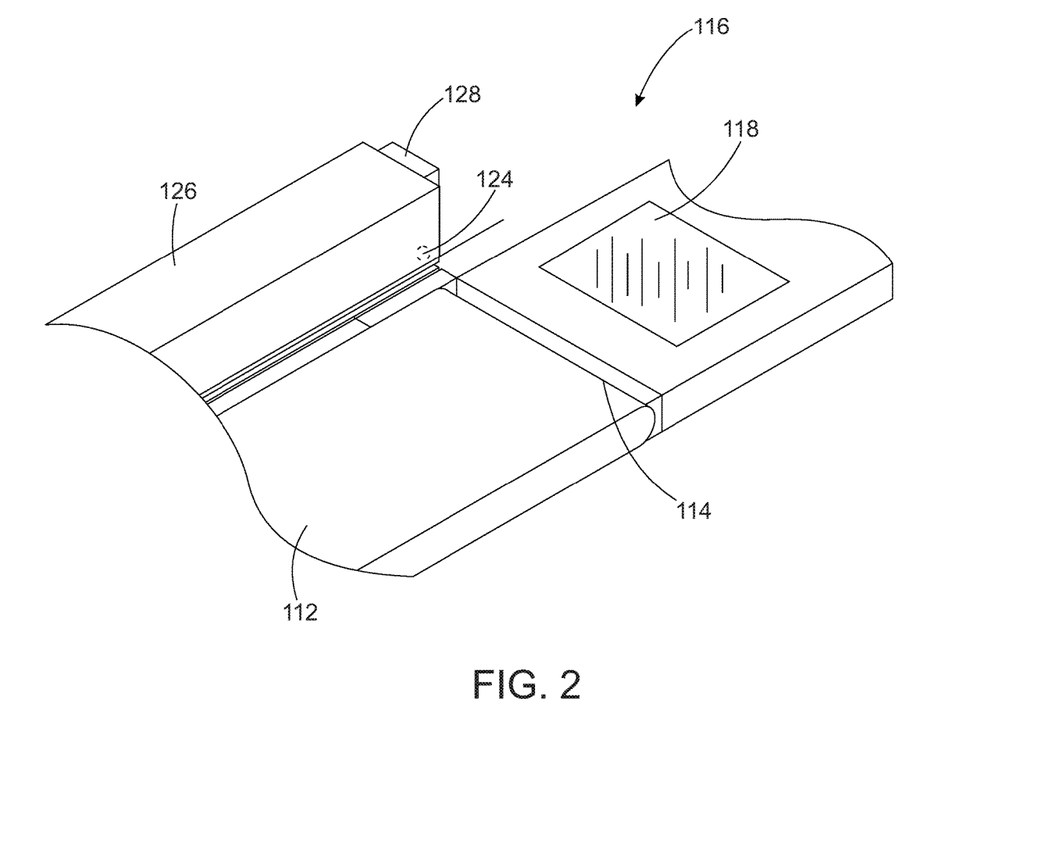
FIG. 2 shows a checkout station in a retail store without the bumper for preventing the divider from covering the belt end sensor.
Figure 3:
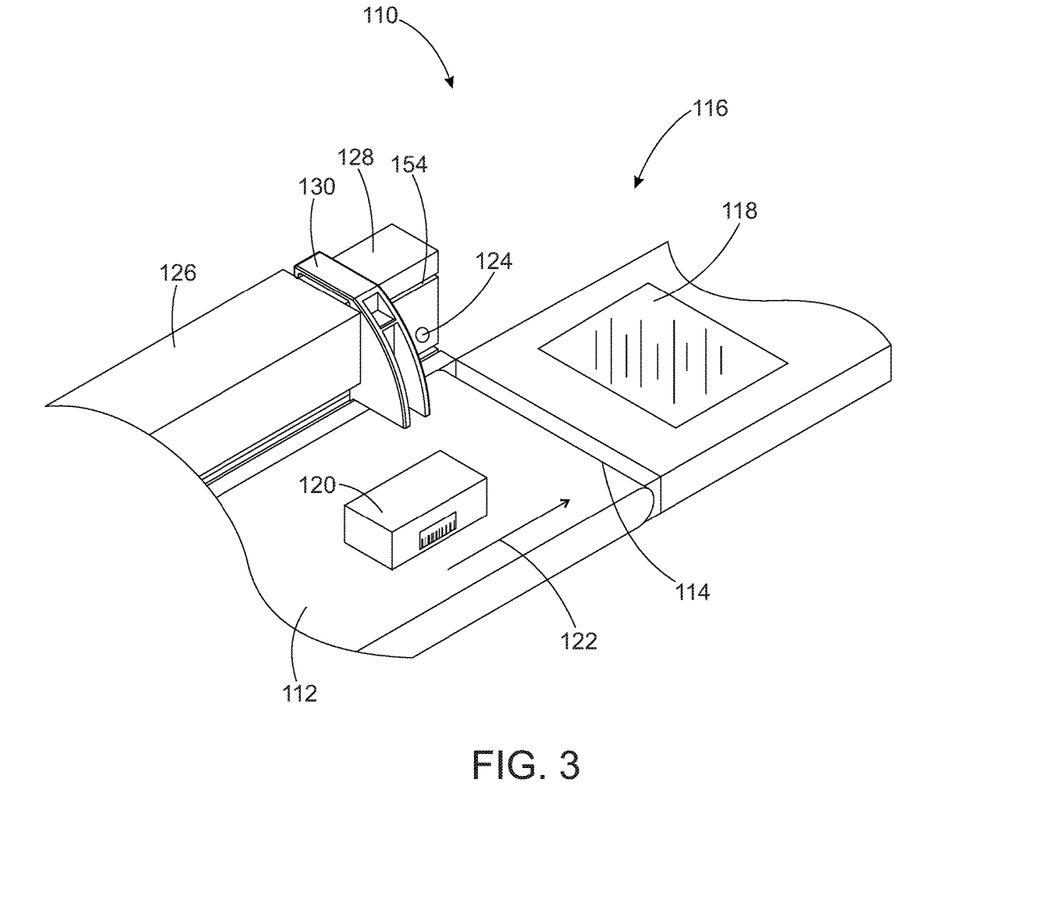
FIG. 3 shows the checkout station of FIG. 1 with the bumper preventing the divider from covering the belt end sensor.
Figure 4:
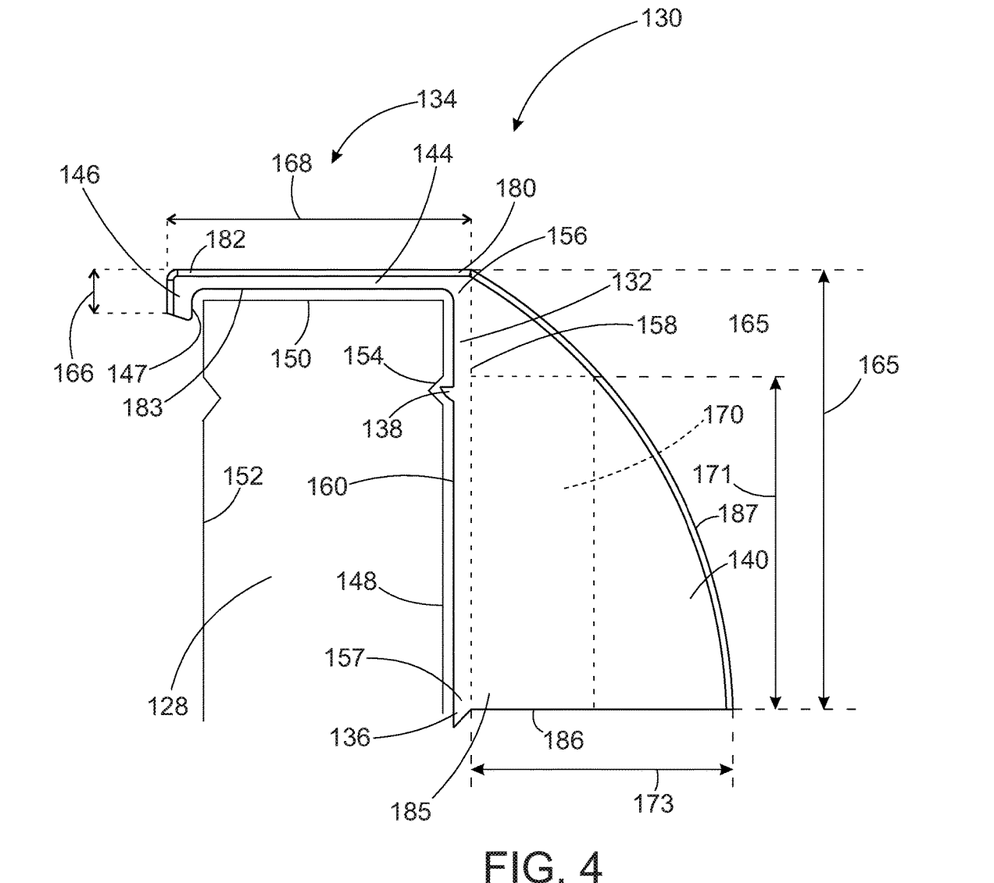
FIG. 4 illustrates a side view cross-section of the bumper of FIG. 1 coupled to an end wall.

FIG. 1 through FIG. 4 show a checkout station with and without a bumper to prevent dividers from activating the belt end sensor. FIG. 1 through FIG. 4 also illustrate how the dividers can cause a problem for the automated operation of a conveyor belt of the checkout station. FIG. 1 shows a partial perspective view of a checkout station 110 with a bumper 130. FIG. 2 shows a perspective view of a checkout station that does not use bumper 130 for preventing a divider 126 from interfering with the operation of a belt end sensor 124. FIG. 3 shows a perspective view of checkout station 110 with bumper 130 preventing divider 126 from covering belt end sensor 124. FIG. 4 shows a cross-section of bumper 130 coupled to an edge wall 128 of checkout station 110.

FIG. 1 and FIG. 3 show checkout station 110 with bumper 130. Checkout station 110 is often in a retail store, but this is not meant to be limiting. Checkout station 110 includes conveyor belt 112, a scan area 116, and edge wall 128. Conveyor belt 112 moves items to be purchased, such as item 120, in a direction 122 towards scan area 116. Scan area 116 includes a scan glass 118, which is the glass cover for the scanner. Holding an item on or near scan glass 118 will cause the scanner to read the bar code of product 120 and enter product 120 into the checkout register for purchase. Conveyor belt 112 has a conveyor belt end 114 that is adjacent scan area 116. Edge wall 128 is adjacent conveyor belt 112, meaning it is along one side of conveyor belt 112, and keeps items to be purchased, such as item 120, from falling off a side edge of conveyor belt 112. Edge wall 128 is also where a divider 126 is stored in between use. Divider 126 sits on edge wall 128 when not in use. Divider 126 is used by customers to divide their group of items to be purchased from another customer's group of items to be purchased. Customers retrieve divider 126 from edge wall 128 and place it between groups of items to be purchased.

Checkout station 110 also includes a belt end sensor 124. Belt end sensor 124 is a means to sense when item 120 reaches conveyor belt end 114. When belt end sensor 124 senses that item 120 has reached conveyor belt end 114, belt end sensor 124 is activated, and stops conveyor belt 112 from moving in direction 122 until item 120 is removed from conveyor belt 112 and belt end sensor 124 does not sense any items at conveyor belt end 114. Thus, belt end sensor 124 helps to automate the movement of conveyor belt 112. This minimizes the amount of human intervention needed to control the movement of conveyor belt 112. Conveyor belt 112 is moved in direction 122 until belt end sensor 124 is activated—senses that an item to be purchased, such as item 120, has reached conveyor belt end 114. Once belt end sensor 124 senses an item at conveyor belt end 114, the motion of conveyor belt 112 is automatically stopped. Conveyor belt 112 will remain stopped as long as belt end sensor 124 is activated—senses one or more items at conveyor belt end 114. Once all the items are removed from conveyor belt end 114, and belt end sensor 124 does not sense any more items at conveyor belt end 114, conveyor belt 112 is automatically turned on and moves in direction 112 until belt end sensor 124 again senses an item at conveyor belt end 114. Belt end sensor 124 can use any means to sense when item 120 reaches conveyor belt end 114. Optical and radio waves are common sensing means, but this is not meant to be limiting.

Checkout station 110 also includes bumper 130 coupled to edge wall 128. Bumper 130 prevents divider 126 from covering and activating belt end sensor 124 and interfering with the automated operation of conveyor belt 112 and belt end sensor 124.

FIG. 2 illustrates the problem encountered when bumper 130 is not used. FIG. 2 shows a checkout station similar to checkout station 110, except without bumper 130. The problem is that divider 126 slides on edge wall 128 and can cover belt end sensor 124 as shown in FIG. 2. When belt end sensor 124 is covered, belt end sensor 124 is activated (belt end sensor 124 thinks it senses an item at belt end 114) and belt end sensor 124 stops conveyor belt 112, whether there are items near conveyor belt end 114 or not, and the automated action of conveyor belt 112 is interrupted. This is frustrating for customers and store employees alike when conveyor belt 112 will not operate. Employees may be called over to fix conveyor belt 112, only to find that the only problem is that belt end sensor 124 is covered by divider 126. FIG. 3 illustrates how bumper 130 solves this issue. Bumper 130 is positioned between divider 126 and belt end sensor 124. Bumper 130 prevents, or blocks, divider 126 from activating belt end sensor 124. Divider 126 comes in contact with bumper 130 and is prevented from moving past bumper 130 and covering belt end sensor 124. Bumper 130 is a means to prevent divider 126 from covering or activating belt end sensor 124 at checkout station 110.

Figure 5:
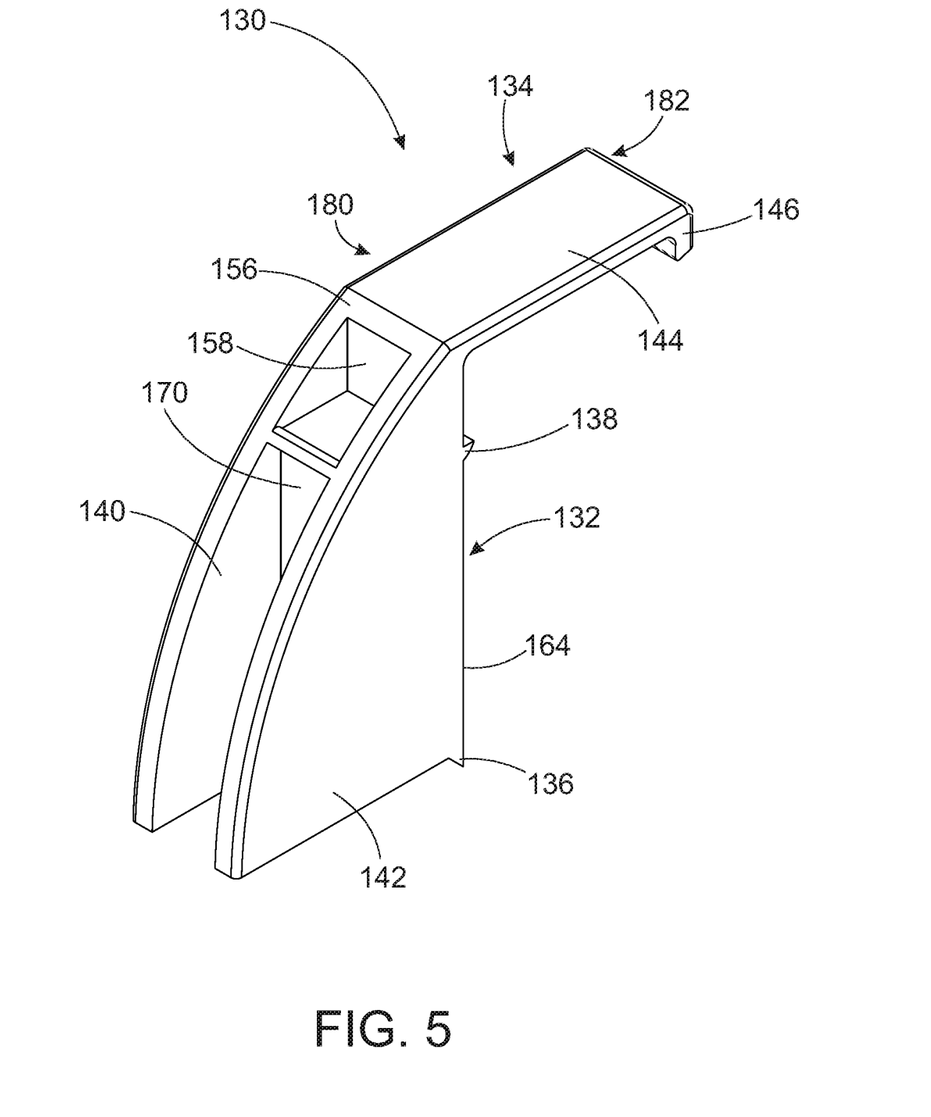
FIG. 5 shows a perspective view of the bumper of FIG. 1 for preventing a divider from covering the belt end sensor.
Figure 6:
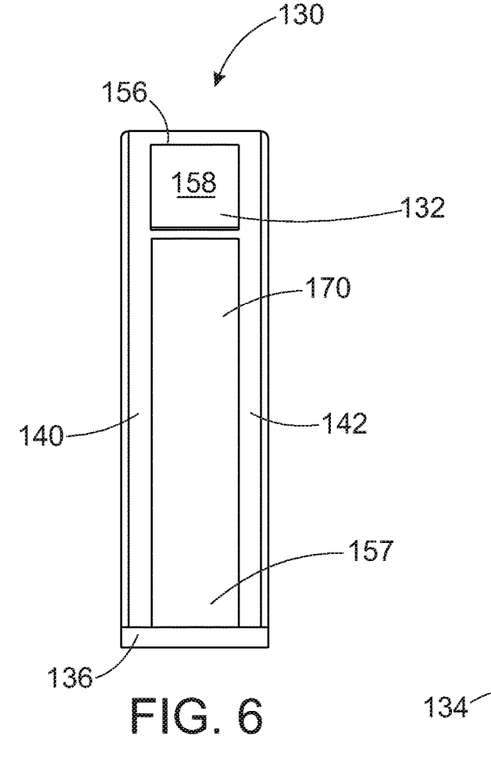
FIG. 6 shows a front view of the bumper of FIG. 5.
Figure 7:
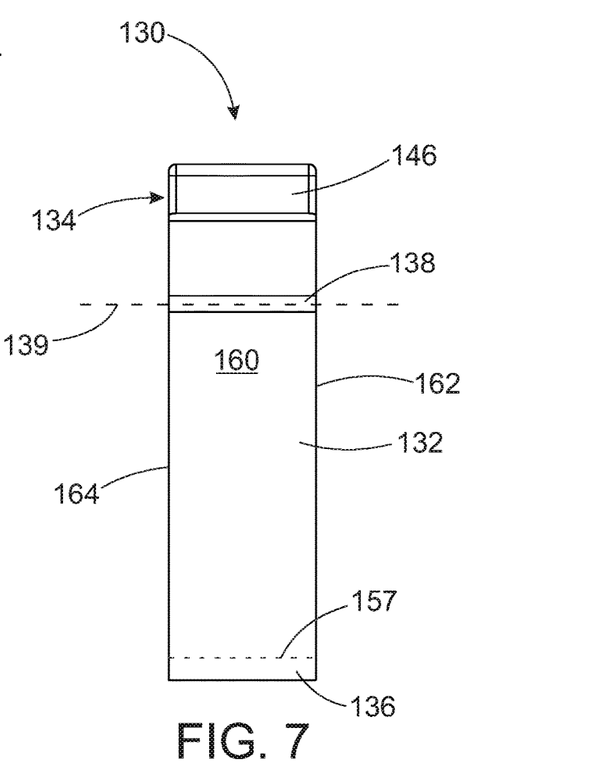
FIG. 7 shows a rear view of the bumper of FIG. 5.
Figure 8:
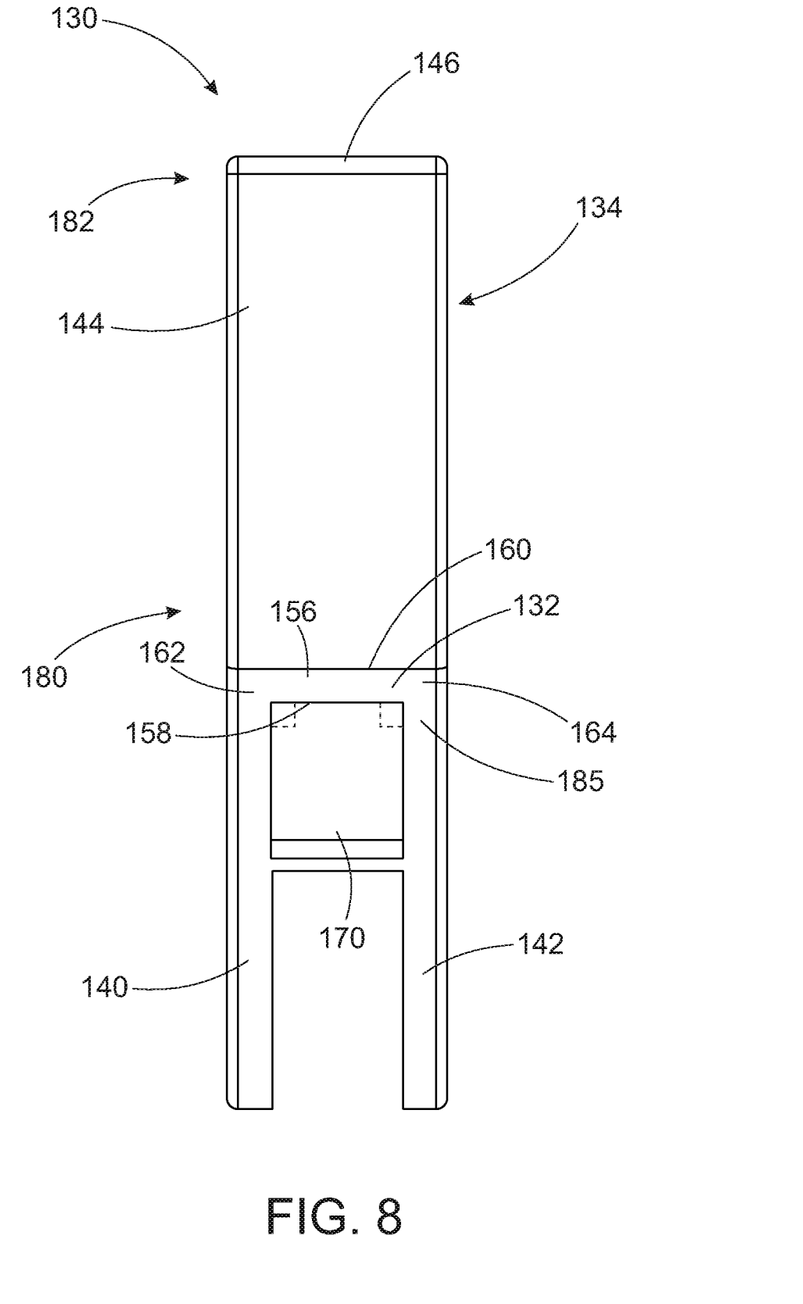
FIG. 8 shows a top view of the bumper of FIG. 5.

FIG. 4 shows a cross-sectional side view of bumper 130 coupled to edge wall 128. FIG. 5 through FIG. 8 shows details of bumper 130. FIG. 5 shows a perspective view of bumper 130. FIG. 6, FIG. 7, and FIG. 8 show front, back, and top views, respectively, of bumper 130.

Bumper 130 includes a backbone 132 and a hook 134 coupled to backbone 132. Hook 134 couples bumper 130 to edge wall 128, as shown in FIG. 4. Backbone 132 and hook 134 make up the main structure of bumper 130. Hook 134 is a means to couple bumper 130 to edge wall 128.

Backbone 132 is a rectangular shaped bar of rigid material. Backbone 132 has a backbone top end 156, and a backbone bottom end 157 opposing backbone top end 156, as can best be seen in FIG. 4, FIG. 6, and FIG. 7. Backbone 132 also includes a first backbone side 162 and a second backbone side 164, best seen in FIG. 7 and FIG. 8, and a backbone front surface 158 (FIG. 4, FIG. 6 and FIG. 8) and a backbone rear surface 160 (FIG. 4 and FIG. 7). Backbone 132 has a backbone length 165.

Hook 134 is coupled to backbone 132. Hook 134 includes a stem 144 and an end piece 146, best seen in FIG. 4. Stem 144 is an elongate rectangular shaped member formed of rigid material with a stem first end 180 and a stem second end 182 opposing stem first end 180. Stem first end 180 is coupled to backbone top end 156 of backbone 132 such that stem 144 and backbone 132 are approximately perpendicular to one another, in this embodiment. Stem 144 of hook 132 extends from backbone rear surface 160 at backbone top end 156. In some embodiments, stem 144 and backbone 132 form an angle of other than 90 degrees, depending on the specific shape of edge wall 128. Stem 144 has a stem length 168.

End piece 146 is a rectangular shaped plate of rigid material extending from stem second end 182 in a direction perpendicular to stem 144, as shown in FIG. 4. End piece 146 is the hook end of hook 134. Stem length 168 of stem 144 is about five to seven times an end piece length 166 of end piece 146. Stem 144 and end piece 146 are coupled to backbone 132 so that backbone 132, stem 144, and end piece 146 wrap around end wall 128 to couple bumper 130 to end wall 128. In this embodiment, backbone 132 and end piece 146 are each perpendicular to stem 144 so that bumper 130 fits securely around rectangular edge wall 128. In some embodiments, edge wall 128 has a cross-sectional shape other than rectangular, and, in these embodiments, backbone 132, stem 144, and end piece 146 are shaped differently to couple to the edge wall.

Once bumper 130 is coupled to edge wall 128, as shown in FIG. 1, FIG. 3, and FIG. 4, backbone rear surface 160 of backbone 132 extends along an edge wall inner surface 148 of edge wall 128. A stem inner surface 183 of stem 144 extends along an edge wall top surface 150 of edge wall 128, and an end piece inner surface 147 of end piece 146 extends along an edge wall outer surface 152 of edge wall 128, as best seen in FIG. 4. In this way, hook 134 couples bumper 130 to edge wall 128.

Bumper 130 has two protrusions 138 and 136 as shown in FIG. 4, FIG. 5, and FIG. 7. Each protrusion 136 and 138 is an elongate protrusion that helps couple bumper 130 to edge wall 128. Each protrusion 136 and 138 runs lengthwise across backbone 132. A 'protrusion' as used here is a nub, cleat, bump or ridge in the surface of bumper 130. Protrusion 138 protrudes, or extends, from backbone rear surface 160 and fits into a corresponding channel 154 of edge wall 128, as shown in FIG. 4. Fitting protrusion 138 into channel 154 helps keep bumper 130 in place on edge wall 128. Protrusion 138 extends from backbone first side 162 to backbone second side 164, and has a protrusion longitudinal axis 139 that is perpendicular to both backbone first side 162 and backbone second side 164, as shown in FIG. 7.

Protrusion 136 extends from backbone bottom end 157 of backbone 132 and fits between edge wall 128 and conveyor belt 112. Protrusions 136 and 138 help keep bumper 130 coupled to edge wall 128.

Bumper 130 is coupled to edge wall 128 using hook 134 and protrusions 136 and 138. Once bumper 130 is coupled to edge wall 128, bumper 130 blocks, or prevents, divider 126 from activating belt end sensor 124.

Bumper 130 also includes at least one fin extending from backbone 132, as shown in the figures. In the embodiment shown, bumper 130 includes two fins, a first fin 140 and a second fin 142, but this is not meant to be limiting. Bumper 130 can include any number of fins. Fins 140 and 142 extend from backbone front surface 158 of backbone 132 to block divider 126 from covering belt end sensor 124. First fin 140 and second fin 142 extend from backbone 132 to keep divider 126 from going over or alongside bumper 130 to reach and cover belt end sensor 124. In the embodiment shown, first fin 140 and second fin 142 each extend perpendicular to backbone front surface 158 of backbone 132.

First fin 140 and second fin 142 are each triangular shaped as seen in side view, as can best be seen in FIG. 4 and FIG. 5, but this is not meant to be limiting. Fins 140 and 142 can take many different shapes. In the embodiment shown in the figures, first fin 140 and second fin 142 are each formed of triangular shaped plates. In this embodiment each of first fin 140 and second fin 142 have two straight sides and one curved side. Specifically first fin 140 and second fin 142 are in the shape of a quadrant of an ellipse in the embodiment shown in the figures. For example, first fin 140 includes a fin first edge 185 (FIG. 4). Fin first edge 185 is straight and is coupled to backbone front surface 158. Fin first edge 185 has a fin first edge length that is the same as a backbone length 165. First fin 140 includes a fin second edge 186. Fin second edge 186 has a fin second edge length 173. Fin second edge 186 is straight and is perpendicular to backbone front surface 158. Fin second edge length 173 is equal to stem length 168, in this embodiment. First fin 140 has a fin third edge 187. Fin third edge 187 is curved in this embodiment. Fin third edge 187 is curved in the shape of an arc of an ellipse.

First fin 140 and second fin 142 are parallel to each other in this embodiment, but this is not meant to be limiting. First fin 140 and second fin 142 can extend from backbone front surface 158 of backbone 132 at different angles and with different shapes, depending on the mechanical configuration of the edge wall and the conveyor belt of a checkout station.

Any size and shape of fins 140 and 142 that prevent divider 126 from covering belt end sensor 124 is envisioned.

Bumper 130 also includes a fin spacer 170. Fin spacer 170 is a rectangular block of material coupled to backbone front surface 158 and positioned between fin 140 and fin 142, as shown in FIG. 4, FIG. 5, and FIG. 6. Fin spacer 170 is coupled to backbone front surface 158, to first fin 140, and to second fin 142. Fin spacer 170 is used to add bulk and sturdiness to bumper 130, to keep fin 140 and 142 from bending or breaking, and to keep backbone 132 from bending or breaking. Fin spacer 170 has a fin spacer length 171. In this embodiment, fin spacer length 171 is less than backbone length 165.

Disclosed is a method of preventing a checkout station belt end sensor from being activated by a divider. The method includes coupling a bumper to an edge wall of the checkout station, where the bumper blocks the divider from covering the belt end sensor. The method can include an act of coupling a hook to a backbone to form a bumper. In some embodiments, the hook is perpendicular to the backbone. The method can include coupling and end piece to a stem to form the hook, wherein the end piece is perpendicular to the stem. The method can include an act of coupling at least one fin to the backbone. In some embodiments, the method includes coupling two fins to the backbone. The method can include positioning a fin spacer between the two fins. In some embodiments, the method includes coupling a protuberance to the backbone. The method can include many other acts.

A checkout station bumper has been shown and described. The checkout station bumper is a means to prevent dividers used at a checkout station conveyor belt from covering or otherwise interfering with the action of a belt end sensor. The bumper includes a means to couple the bumper to an edge wall of the checkout station. Once the bumper is coupled to the edge wall, the bumper blocks dividers that are stored on the edge wall from sliding on top of and covering the belt end sensor of the conveyor belt. This prevents the conveyor belt from stopping movement when it should keep moving. The bumper includes a backbone and a hook. The hook couples the bumper to the edge wall. The bumper also includes at least one fin coupled to the backbone. The fin extends from the backbone and blocks dividers from sliding over the belt end sensor and activating the belt end sensor.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A checkout station bumper, the bumper comprising:
a backbone, wherein the backbone is a rectangular shaped bar of rigid material comprising:
    a backbone top end;
    a backbone bottom end opposing the backbone top end;
    a first backbone side;
    a second backbone side;
    a backbone front surface; and
    a backbone rear surface;
a first fin and a second fin extending from the backbone front surface; and a hook coupled to the backbone, wherein the hook comprises:
a stem having a stem first end and a stem second end opposing the stem first end, wherein the stem first end is coupled to the backbone top end, and wherein the stem extends from the backbone rear surface in a direction perpendicular to the backbone rear surface; and
an end piece coupled to the stem second end, wherein the end piece is a rectangular shaped plate that extends perpendicular to the stem;
wherein the bumper blocks a divider of a checkout station from activating a belt end sensor in response to the bumper being coupled to an edge wall of the checkout station.

2. The bumper of claim 1, wherein the stem is about five times longer than the end piece.

3. The bumper of claim 1, wherein the first fin and the second fin are perpendicular to the backbone front surface.

4. The bumper of claim 3, wherein the first fin and the second fin are each triangular shaped plates.

5. The bumper of claim 4, wherein the first fin and the second fin are parallel to each other.

6. The bumper of claim 5, wherein the first fin comprises:
a fin first edge, wherein the fin first edge is straight and wherein the fin first edge is coupled to the backbone front surface;
a fin second edge, wherein the fin second edge is straight and wherein the fin second edge is perpendicular to the backbone front surface; and
a fin third edge, wherein the fin third edge is curved.

7. The bumper of claim 6, further comprising a fin spacer located between the first fin and the second fin, wherein the fin spacer is coupled to the backbone front surface and to each of the first and the second fins.

8. The bumper of claim 7, wherein a fin spacer length is less than a backbone length.

9. The bumper of claim 8, wherein a fin second edge length is equal to a stem length.

10. A checkout station in a retail store comprising:
a conveyor belt with a conveyor belt end adjacent a scan area, wherein the conveyor belt moves an item to be purchased towards the scan area;
a belt end sensor that senses when the item to be purchased reaches the conveyor belt end of the conveyor belt;
an edge wall positioned adjacent the conveyor belt;
a divider that sits on the edge wall; and
a bumper that couples to the edge wall, wherein the bumper prevents the divider from covering the belt end sensor.

11. The checkout station of claim 10, wherein the bumper comprises:
a backbone, wherein the backbone is a rectangular shaped bar of rigid material having a backbone top end, a backbone bottom end opposing the backbone top end, a first backbone side, a second backbone side, a backbone front surface, and a backbone rear surface; and
a hook coupled to, and extending perpendicularly from, the backbone rear surface at the backbone top end, wherein the hook couples the bumper to the edge wall.

12. The checkout station of claim 11, wherein the bumper comprises a protrusion extending from the backbone rear surface, wherein the protrusion extends from the backbone first side to the backbone second side along the backbone rear surface, and wherein a protrusion longitudinal axis is perpendicular to the backbone first side and the backbone second side.

13. The checkout station of claim 12, wherein the edge wall comprises a channel that receives the protrusion.

14. The checkout station of claim 11, wherein the hook comprises:
a stem, wherein the stem is an elongate bar of rigid material having a stem first end and a stem second end opposing the stem first end, and wherein the stem first end is coupled to the backbone top end; and
an end piece coupled to the stem second end, wherein the end piece is a rectangular plate that is perpendicular to the stem.

15. The checkout station of claim 14, wherein the backbone rear surface extends along an edge wall inner surface, a stem inner surface extends across an edge wall top surface, and an end piece inner surface extends along an edge wall outer surface in response to the bumper being coupled to the edge wall.

16. The checkout station of claim 15, wherein the bumper further comprises a first fin and a second fin extending from the backbone front surface.

17. The checkout station of claim 16, wherein the first fin and the second fin are each triangular shaped plates.

18. The checkout station of claim 17, wherein the bumper further comprises a fin spacer located between the first and the second fins, wherein the fin spacer is coupled to the backbone front surface and to the first and the second fin.

* * * * *